US012797280B2

(12) United States Patent
Wang et al.

(10) Patent No.: US 12,797,280 B2
(45) Date of Patent: Nov. 17, 2026

(54) ANKLE JOINT REHABILITATION TRAINING DEVICE

(71) Applicant: Zhengzhou Angelexo Intelligent Technologies Co., Ltd., Zhengzhou (CN)

(72) Inventors: Jianhui Wang, Zhengzhou (CN); Jianwei Chen, Zhengzhou (CN); Luya Li, Zhengzhou (CN); Sen Yang, Zhengzhou (CN)

(73) Assignee: Zhengzhou Angelexo Intelligent Technologies Co., Ltd., Zhengzhou (CN)

( * ) Notice: Subject to any disclaimer, the term of this patent is extended or adjusted under 35 U.S.C. 154(b) by 64 days.

(21) Appl. No.: 18/019,761

(22) PCT Filed: Oct. 21, 2022

(86) PCT No.: PCT/CN2022/126698

§ 371 (c)(1),
(2) Date: Feb. 3, 2023

(87) PCT Pub. No.: WO2023/236414

PCT Pub. Date: Dec. 14, 2023

(65) Prior Publication Data

US 2025/0090405 A1 Mar. 20, 2025

(30) Foreign Application Priority Data

Jun. 6, 2022 (CN) ........................ 202210633537.6

(51) Int. Cl.
*A61H 1/02* (2006.01)

(52) U.S. Cl.
CPC ... *A61H 1/0266* (2013.01); *A61H 2001/0203* (2013.01); *A61H 2001/0207* (2013.01); *A61H 2201/018* (2013.01)

(58) Field of Classification Search
CPC .... A61H 1/02–0296; A61H 2201/1215; A61H 2201/1207; A61H 2201/164; A61H 2201/5069; A61H 2201/5058
See application file for complete search history.

(56) References Cited

U.S. PATENT DOCUMENTS 5,738,636 A * 4/1998 Saringer .............. A61H 1/0285 601/29
2009/0306548 A1* 12/2009 Bhugra ............ A63B 21/00181 600/587

(Continued)

FOREIGN PATENT DOCUMENTS

CN 1956692 A 5/2007
CN 102614066 B 1/2016

(Continued)

OTHER PUBLICATIONS

Chinese Notice of Allowance, CN Application No. 202210633537.6, Apr. 24, 2025, 3 pages.

(Continued)

*Primary Examiner* — Valerie L Woodward
(74) *Attorney, Agent, or Firm* — FENWICK & WEST LLP

(57) ABSTRACT

Provided is an ankle joint rehabilitation training device, wherein the device acquires an actual movement parameter of a patient by a sensor assembly, determines a parameter difference according to the actual movement parameter and an application movement parameter by a controller, and adjusts the application movement parameter according to the parameter difference and the actual movement parameter, finally generates a movement instruction, and drives a foot support to move by the motor according to the movement instruction, so as to perform the rehabilitation training on the patient's foot. Since the current movement ability of the patient is considered in the process of rehabilitation training, (Continued)

the rehabilitation training is more suitable to personal condition of the patient, meanwhile, the rehabilitation training also considers the application movement parameter corresponding to the target rehabilitation strategy.

18 Claims, 4 Drawing Sheets

(56) References Cited

U.S. PATENT DOCUMENTS

| | | | | |
|---|---|---|---|---|
| 2018/0177664 | A1* | 6/2018 | Choi | A63B 23/10 |
| 2020/0179215 | A1* | 6/2020 | Lerner | A61H 1/0244 |
| 2021/0369536 | A1* | 12/2021 | Mooney | A61H 1/0266 |
| 2021/0378903 | A1* | 12/2021 | Mooney | A61H 3/00 |
| 2022/0031552 | A1* | 2/2022 | Mooney | A61H 3/00 |
| 2024/0139055 | A1* | 5/2024 | Mooney | G16H 20/30 |

FOREIGN PATENT DOCUMENTS

| | | | |
|---|---|---|---|
| CN | 108970014 | A | 12/2018 |
| CN | 208799724 | U | 4/2019 |
| CN | 111449899 | A | 7/2020 |
| CN | 113223662 | A | 8/2021 |
| CN | 114366549 | A | 4/2022 |
| CN | 216496401 | U | 5/2022 |
| EP | 3085351 | A1 | 10/2016 |
| JP | 2003-038589 | A | 2/2003 |
| JP | 2005-237762 | A | 9/2005 |
| JP | 2018-075063 | A | 5/2018 |

OTHER PUBLICATIONS

Chinese Office Action, CN Application No. 202210633537.6, Mar. 4, 2025, 13 pages.

European Office Action, EP Application No. 22839619.8, Feb. 7, 2025, 9 pages.

European Office Action, EP Application No. 22839619.8, Jan. 15, 2024, 9 pages.

International Search Report, PCT Application No. PCT/CN2022/126698, Dec. 21, 2022, 12 pages.

International Written Opinion, PCT Application No. PCT/CN2022/126698, Dec. 21, 2022, 14 pages.

Japanese Notice of Allowance, JP Application No. 2023-505398, Sep. 24, 2024, 2 pages.

Japanese Office Action, JP Application No. 2023-505398, Jul. 23, 2024, 3 pages.

* cited by examiner

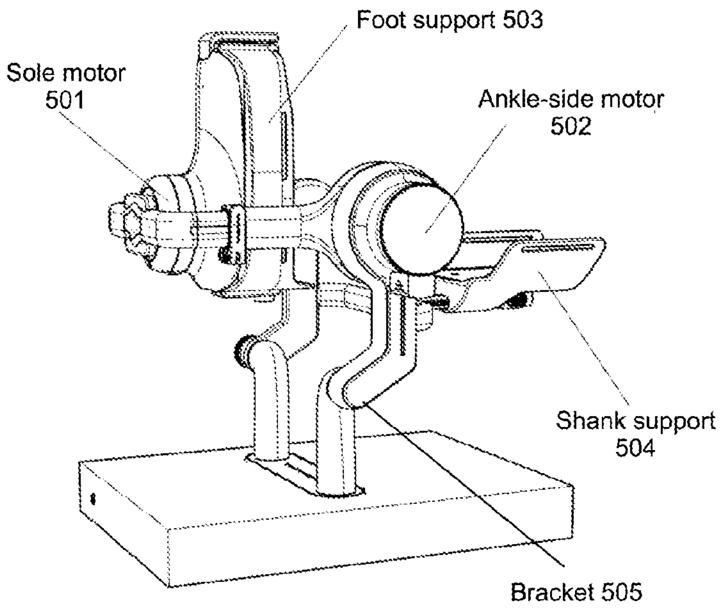

FIG. 5

Detect the actual movement parameter of the patient by means of the sensor assembly — S602

↓

Generate a movement instruction matched with the patient according to the actual movement parameter and an application movement parameter corresponding to a target rehabilitation strategy selected by the patient — S604

↓

Trigger the motor to execute the movement instruction, so that the motor drives the foot support to move, so as to perform the rehabilitation training on the foot of the patient — S606

FIG. 6

ANKLE JOINT REHABILITATION TRAINING DEVICE

CROSS-REFERENCE TO RELATED APPLICATION

This application is a U.S. National Phase Application, filed under 35 U.S.C. § 371, of International Application No. PCT/CN2022/126698 filed Oct. 21, 2022, entitled "Ankle Joint Rehabilitation Training Device", which claims priority to Chinese patent application no. 202210633537.6 filed on Jun. 6, 2022, and entitled "Ankle Joint Rehabilitation Training Device". Each of the foregoing disclosures is incorporated herein by reference in its entirety.

TECHNICAL FIELD

The present disclosure relates to the technical field of rehabilitation training, and in particular to an ankle joint rehabilitation training device.

BACKGROUND ART

Related ankle joint rehabilitation devices generally adopt two modes, wherein a first mode is that a rehabilitation therapist manually performs ankle joint rehabilitation training on a patient, and a second mode is that automated rehabilitation equipment is completely used to perform rehabilitation training on an ankle joint of a patient.

With regard to the device for manual rehabilitation treatment of the rehabilitation therapist, since manual rehabilitation efficiency of the rehabilitation therapist is low and working intensity is large, and it is difficult for the rehabilitation therapist to precisely control the techniques according to the patient's situation, the rehabilitation effects are non-uniform. On the other hand, by using the automated rehabilitation training equipment to perform repeated passive rehabilitation training for the patient, the rehabilitation process of the patient cannot be learned in time, and personalization and pertinence are lacking, thus affecting the rehabilitation effect.

SUMMARY

In view of this, the present disclosure aims at providing an ankle joint rehabilitation training device (a device for rehabilitation training of an ankle joint), so as to improve the efficiency of rehabilitation training and rehabilitation effect of a patient.

An embodiment of the present disclosure provides an ankle joint rehabilitation training device, wherein the device includes a foot support, a bracket, a sensor assembly, a controller, and a motor, wherein the foot support is provided on the bracket, the foot support is movably connected to the bracket and can move relative to an axial direction of the bracket, the sensor assembly and the motor are arranged on the foot support, and the sensor assembly and the motor are both in communication connection with the controller; the foot support is configured to support the patient's foot; the sensor assembly is configured to detect an actual movement parameter of the patient and send the actual movement parameter to the controller, wherein the actual movement parameter is configured to characterize an ankle joint movement ability of the patient; the controller is configured to generate a movement instruction matched with the patient according to the actual movement parameter and an application movement parameter corresponding to a target rehabilitation strategy of the patient, and issue the movement instruction to the motor; the controller further includes a comparison module and an adjustment module, wherein the comparison module is configured to determine a parameter difference according to the actual movement parameter and the application movement parameter; the adjustment module is configured to adjust the application movement parameter according to the actual movement parameter when the parameter difference is greater than a difference threshold; and the motor is configured to drive the foot support to move according to the movement instruction issued by the controller, so as to perform a rehabilitation training on the patient's foot.

Optionally, the above actual movement parameter of the patient include a movement angle and a current of the patient in a movement process; the sensor assembly includes an angle sensor and a motor current sensor; the angle sensor is configured to acquire a movement angle of the patient in the movement process; and the motor current sensor is configured to acquire the motor current corresponding to the motor in the movement process of the patient.

Optionally, the above movement angle includes at least one of plantarflexion and dorsiflexion angles, adduction and abduction angles, and inversion and eversion angles; and the angle sensor includes at least one of a plantarflexion and dorsiflexion angle sensor, an adduction and abduction angle sensor, and an inversion and eversion angle sensor.

Optionally, the above motor current includes at least one of a plantarflexion and dorsiflexion motor current, an adduction and abduction motor current, and an inversion and eversion motor current; and the motor current sensor includes at least one of a plantarflexion and dorsiflexion motor current sensor, an adduction and abduction motor current sensor, and an inversion and eversion motor current sensor.

Optionally, the above controller includes an angle conversion module and a current conversion module, wherein the angle conversion module is configured to perform coordinate system transformation on the movement angle to obtain a joint movement degree of the patient; and the current conversion module is configured to obtain the patient's muscle strength according to a measured current and a baseline current, wherein the baseline current is a current generated in a movement process of the ankle joint rehabilitation training device when the patient does not exert a force, and the measured current is a current generated in the movement process of the ankle joint rehabilitation training device when the patient exerts a force.

Optionally, the above patient's muscle strength is calculated through the following formula: patient's muscle strength=(measured current–baseline current) moment coefficient*muscle strength coefficient.

Optionally, when adjusting the application movement parameters, optimization coefficients of respective parameters are set as $a_i$, i=1, 2, 3 . . . , wherein $$a_i = \frac{x_d - x_c}{x_c},$$

$x_c$ is an application movement parameter value obtained from first detection after the application movement parameters are adjusted in a previous time, and $x_d$ is an application movement parameter value obtained from last detection after the application movement parameters are adjusted in the previous time; alternatively, $$a_i = \frac{x_d - x_c}{x_c} \cdot x_j,$$

where $x_c$ is an application movement parameter value obtained from first detection after the application movement parameters are adjusted in a previous time, and $x_d$ is an application movement parameter value obtained from last detection after the application movement parameters are adjusted in the previous time, and $x_j$ are secondary correction parameters corresponding to various application movement parameters obtained through machine learning, wherein j=1, 2, 3 . . . ; and the application movement parameter is equal to the current actual movement parameter times $a_i$.

Optionally, the above controller further includes a machine learning module, configured to input the actual movement parameters and the application movement parameters into a pre-trained machine learning model, so as to obtain corrected application movement parameters output by the machine learning model.

Optionally, the above controller further includes a prescription selecting module, configured to acquire an application movement parameter from a preset prescription according to the actual movement parameter, wherein the preset prescription includes at least one of a preset movement action, a preset movement maximum angle, repeated times of a preset action, and a sequence of preset actions.

Optionally, the above controller further includes a teaching module, configured to acquire teaching data of a field teaching process of the rehabilitation therapist, and acquire the application movement parameters matched with the actual movement parameters according to the teaching data, wherein the teaching data includes at least one of an angle of the patient, a movement trajectory, an angular velocity, and a force in the rehabilitation training process performed by the rehabilitation therapist on the patient.

Optionally, the above controller further includes a booster module, configured to apply a preset force value to the motor in the same direction as an operating direction of the rehabilitation therapist in the field teaching process of the rehabilitation therapist, so that the motor drives the foot support to move, wherein a net resistance to the motor in the movement process of the foot support is less than the preset force value.

Optionally, the above controller further includes a teaching data module, wherein the teaching data module includes a function curve generator and a storage module.

Optionally, the above function curve generator generates a function curve through the following steps: calculating a movement speed through a collecting time period and a change data of the movement angle; generating a combined movement trajectory curve of the plantarflexion and dorsiflexion angles, the adduction and abduction angles, and the inversion and eversion according to filtered valid plantarflexion and dorsiflexion angles, adduction and abduction angles, inversion and eversion angles, plantarflexion and dorsiflexion currents, adduction and abduction currents, and inversion and eversion currents; applying a current change to data of the filtered valid plantarflexion and dorsiflexion currents, adduction and abduction currents, and inversion and eversion currents in a movement trajectory curve; and generating a function curve with a movement trajectory, a speed change, and a force change.

Optionally, the above data storage module stores data through the following process: performing a data extraction on the function curve generated by the function curve generator, i.e., extracting a group of data at a certain interval; and performing an encrypting and calibrating processing on the data and then converting the data into a data file storable in a computer.

Embodiments of the present disclosure further provide an ankle joint rehabilitation training method (a method for rehabilitation training of an ankle joint), applied to the ankle joint rehabilitation training device, wherein the method may include the following steps: detecting an actual movement parameter of a patient by means of a sensor assembly, wherein the actual movement parameter is configured to characterize a movement ability of an ankle joint of the patient at a current moment; generating a movement instruction matched with the patient according to the actual movement parameter and an application movement parameter corresponding to a target rehabilitation strategy selected by the patient; and triggering a motor to execute the movement instruction, so that the motor drives a foot support to move, so as to perform a rehabilitation training on the patient's foot.

Compared with the related technologies, the embodiments of the present disclosure have the following beneficial effects:

- the above ankle joint rehabilitation training device provided in the embodiments of the present disclosure acquires the actual movement parameter of the patient by the sensor assembly, determines a parameter difference according to the actual movement parameter and the application movement parameter by the controller, and adjusts the application movement parameter according to the parameter difference and the actual movement parameter. Finally, the ankle joint rehabilitation training device generates the movement instruction, and drives the foot support to move by the motor according to the movement instruction, so as to perform the rehabilitation training on the patient's foot. Since the current movement ability of the patient is considered in the process of rehabilitation training, the rehabilitation training is more suitable to personal condition of the patient; meanwhile, the rehabilitation training also considers the application movement parameters corresponding to the target rehabilitation strategy, therefore, the rehabilitation efficiency is considered while being adapted to the patient, and the effect of the rehabilitation training of the user is effectively improved.

Other features and advantages of the present disclosure will be illustrated in subsequent description, or some features and advantages may be deduced from the description or undoubtedly determined, or obtained by implementing the above technology of the present disclosure.

In order to make the above objectives, features, and advantages of the present disclosure more obvious and understandable, preferable embodiments are particularly illustrated in the following to give detailed descriptions in conjunction with the accompanying drawings.

BRIEF DESCRIPTION OF DRAWINGS

In order to more clearly illustrate embodiments of the present disclosure or technical solutions in the related art, accompanying drawings which need to be used for description of the embodiments or the related art will be introduced briefly below, and apparently, the accompanying drawings in the description below merely show some embodiments of the present disclosure, and those ordinarily skilled in the art still could obtain other relevant accompanying drawings in light of these accompanying drawings, without paying creative effort.

FIG. 5 is a schematic structural diagram of an ankle joint rehabilitation training device in a practical application scenario provided in an embodiment of the present disclosure; and FIG. 6 is a flowchart of an ankle joint rehabilitation training method provided in an embodiment of the present disclosure.

Figure 1:
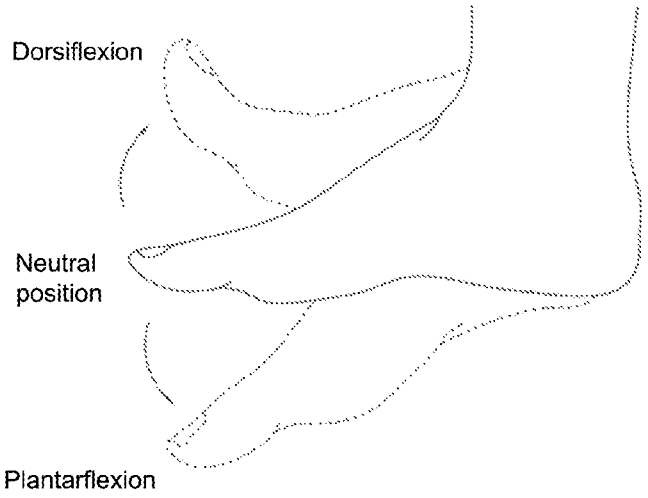
FIG. 1 is a schematic diagram of dorsiflexion and plantarflexion movements of an ankle joint.

In the drawings: 402—foot support; 404—bracket; 406—sensor assembly; 408—controller; 410—motor; 501—sole motor; 502—ankle-side motor; 503—foot support; 504—shank support; 505—bracket.

DETAILED DESCRIPTION OF EMBODIMENTS

In order to make objectives, technical solutions, and advantages of the embodiments of the present disclosure clearer, the technical solutions of the present disclosure will be described clearly and completely below in conjunction with accompanying drawings, and apparently, the embodiments described are some but not all embodiments of the present disclosure. All of other embodiments obtained by those ordinarily skilled in the art based on the embodiments in the present disclosure without paying creative efforts shall fall within the scope of protection of the present disclosure.

In a related method for manual rehabilitation training, the therapist has low manual treatment efficiency and great working intensity, and meanwhile, it is difficult for the therapist to precisely control the techniques according to the patient's situation, and the effect of treatment rehabilitation is non-uniform. When a therapist performs rehabilitation by hand feeling, it is not easy to achieve uniformity of strength, angle, and trajectory for multiple repeated actions in various directions. For different therapists of the same patient, the uniformity of their strength, angles, and trajectories can also hardly be ensured. On the other hand, for a related automated rehabilitation trainer, repeated passive rehabilitation training is performed by manually setting parameters, wherein the reasonability of the parameter setting and the training effects are non-uniform, the rehabilitation progress of the patient and the change of movement degree etc. cannot be perceived in time, and suitable training parameter adjustment cannot be performed according to the patient's rehabilitation process. In view of this, an embodiment of the present disclosure provides an ankle joint rehabilitation training device, so as to improve the efficiency and rehabilitation effect of rehabilitation training of the patient.

Several action types of the ankle joint involved in embodiments of the present disclosure are first explained and illustrated in the following with reference to FIG. 1 to FIG. 3.

Referring to FIG. 1, it shows dorsiflexion and plantarflexion movements of an ankle joint. Dorsiflexion and plantarflexion are two terms for describing foot movement modes. Dorsiflexion refers to an action of moving toes upwards and bringing instep close to the front of shank, i.e., hooking toes. Plantarflexion refers to an action of dropping toes and bringing instep away from the front of shank, i.e., straightening toes.

Figure 2:
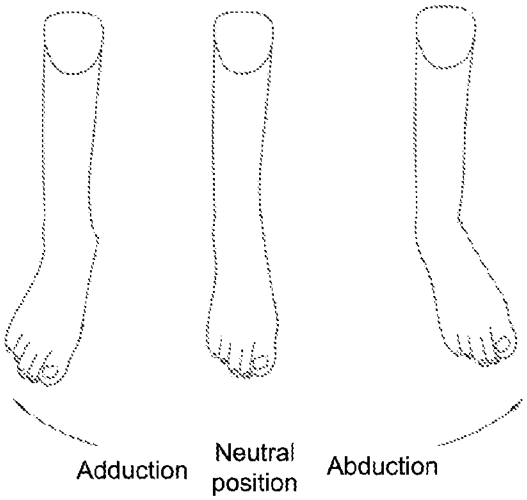
FIG. 2 is a schematic diagram of adduction and abduction movements of an ankle joint.

Referring to FIG. 2, it shows adduction and abduction movements of an ankle joint. Adduction and abduction are anatomical terms related to possible movements of joint. Adduction is an action of moving an outer side of foot towards a midline of body, and abduction is an action of lifting the outer side of the foot laterally away from the body. Both movements occur on a single movement plane.

Figure 3:
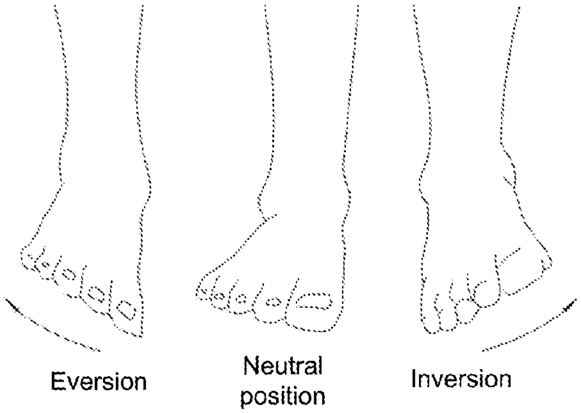
FIG. 3 is a schematic diagram of inversion and eversion movements of an ankle joint.

Referring to FIG. 3, it shows states of inversion and eversion movements of an ankle joint.

Figure 4:
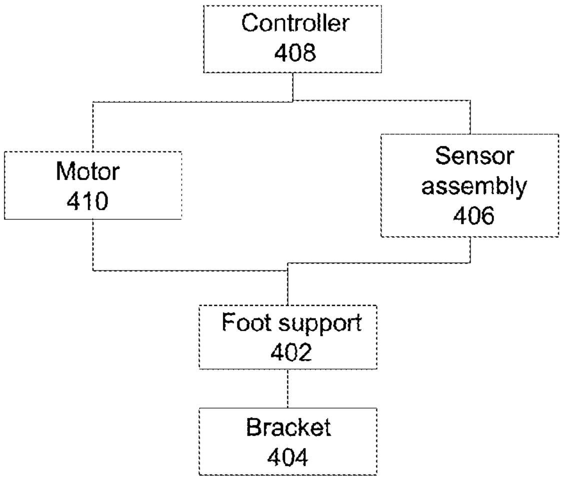
FIG. 4 is a schematic structural diagram of an ankle joint rehabilitation training device provided in an embodiment of the present disclosure.

An ankle joint rehabilitation training device provided in an embodiment of the present disclosure is described in detail below. Referring to a structural schematic diagram of an ankle joint rehabilitation training device according to an embodiment of the present disclosure shown in FIG. 4, the device includes: a foot support 402, a bracket 404, a sensor assembly 406, a controller 408, and a motor 410, wherein the foot support 402 is provided on the bracket 404, the foot support 402 is movably connected to the bracket 404 and can move relative to an axial direction of the bracket 404, the sensor assembly 406 and the motor 410 are arranged on the foot support 402, and the sensor assembly 406 and the motor 410 are both in communication connection with the controller 408.

In the above, the bracket 404 may be any support body that can be fixed on the ground or other planes. The foot support 402 is configured to support the patient's foot. The foot support 402 can be designed in a size-adjustable form so as to be adapted to different patients' foot models, and may also be designed in a form with a fixed size, but can be adapted to foot models of most people. The embodiments of the present disclosure do not limit the specific structure of the foot support 402.

The sensor assembly 406 is configured to detect an actual movement parameter of the patient and send the actual movement parameter to the controller 408, wherein the actual movement parameter is configured to characterize movement ability of an ankle joint of the patient. During each time of rehabilitation training, the patient's movement ability will have some changes, and correspondingly, the rehabilitation training for the patient also needs to be adjusted correspondingly, then the rehabilitation training can be better performed on the patient, and therefore, the ankle joint rehabilitation training device provided in the embodiments of the present disclosure detects and obtains the actual movement parameter of the patient by the sensor assembly 406, and sends the same to the controller. In some examples, the actual movement parameter may include an angle of the ankle joint of the patient, may also include a force of the ankle joint of the patient, or includes an angular velocity of the ankle joint of the patient during movement. The movement parameter may be one of the above parameters, and may also include all of the above parameters.

The controller 408 is configured to generate a movement instruction matched with the patient according to the actual movement parameter and an application movement parameter corresponding to a target rehabilitation strategy of the patient, and issue the movement instruction to the motor 410. Specifically, in addition to the above assemblies and components, the ankle joint rehabilitation training device provided in the embodiments of the present disclosure further may include a memory, wherein the memory stores a plurality of rehabilitation strategies, and the plurality of rehabilitation strategies can be teaching data of a rehabilitation therapist, and also can be a rehabilitation strategy selected by the patient during a plurality of rehabilitation training processes before current moment. The target rehabilitation strategy of the patient may be a rehabilitation strategy selected from a plurality of teaching data or historical rehabilitation strategies, and also may be a rehabilitation strategy automatically selected by the controller for the patient according to a previous movement situation of the patient.

In some possible embodiments, the above controller includes an angle conversion module and a current conversion module, wherein the angle conversion module is configured to perform a coordinate system transformation on the movement angle to obtain a joint movement degree of the patient; the current conversion module is configured to obtain the patient's muscle strength according to a measured current and a baseline current; the baseline current is a current generated in a movement process of the ankle joint rehabilitation training device when the patient does not exert a force, and the measured current is a current generated in the movement process of the ankle joint rehabilitation training device when the patient exerts a force.

After the sensor assembly detects and obtains plantarflexion and dorsiflexion angles, adduction and abduction angles, inversion and eversion angles, plantarflexion and dorsiflexion currents, adduction and abduction currents, and inversion and eversion currents, the controller analyzes and calculates the above angles and currents.

For the angles, the plantarflexion and dorsiflexion angles, the adduction and abduction angles, and the inversion and eversion angles are converted into the joint movement degree of the patient's ankle joint through the coordinate system.

For the motor currents, the plantarflexion and dorsiflexion currents, the adduction and abduction currents, and the inversion and eversion currents are converted into the patient's muscle strength through calculation. Specifically, the patient's muscle strength can be calculated through the following formula:

The patient's muscle strength $N$=(measured current $Ix$−baseline current $I0$) moment coefficient $K1$*muscle strength coefficient $K2$.

The motor 410 is configured to drive the foot support 402 to move according to the movement instruction issued by the controller 408, so as to perform the rehabilitation training on the patient's ankle joint. After receiving the movement instruction of the controller 408, the motor 410 can control the foot support 402 to perform corresponding movement. Specifically, the motor 410 can be constituted by a plantarflexion and dorsiflexion motor, an adduction and abduction motor, an inversion and eversion motor, and a motor controller. After receiving the instruction of the controller 408, the motor controller analyses and calculates and then converts the same into a parameter of the control motor, wherein the parameter of the control motor includes a movement speed, an angle range, an output moment magnitude, etc. in various movement directions. The motor controller controls the motor to perform the movement control according to the movement trajectory, the angle changes, and the force magnitude changes for data parameter.

The above ankle joint rehabilitation training device provided in the embodiments of the present disclosure acquires the actual movement parameter of the patient by the sensor assembly, determines a parameter difference according to the actual movement parameter and the application movement parameter by the controller, and adjusts the application movement parameter according to the parameter difference and the actual movement parameter. Finally, the ankle joint rehabilitation training device generates the movement instruction, and drives the foot support to move by the motor according to the movement instruction, so as to perform the rehabilitation training on the patient's foot. Since the current movement ability of the patient is considered in the process of rehabilitation training, the rehabilitation training is more suitable to personal condition of the patient; meanwhile, the rehabilitation training also considers the application movement parameter corresponding to the target rehabilitation strategy, therefore, the rehabilitation efficiency is considered while being adapted to the patient, and the effect of the rehabilitation training of the user is effectively improved.

In some possible embodiments, the actual movement parameter of the patient includes a movement angle and a current of the patient in the movement process; and in order to detect the movement angle and the current of the patient, the above sensor assembly may specifically include an angle sensor and a motor current sensor.

In the above, the angle sensor is configured to acquire the movement angle of the patient in the movement process, wherein the movement angle includes at least one of the plantarflexion and dorsiflexion angles, the adduction and abduction angles, and the inversion and eversion angles; and based on this, the above angle sensor includes at least one of a plantarflexion and dorsiflexion angle sensor, an adduction and abduction angle sensor, and an inversion and eversion angle sensor.

The working principle of angle measurement is that the patient puts a leg on the foot support, and the controller informs the motor to perform periodic directional movements with the plantarflexion and dorsiflexion angles, the adduction and abduction angles, and the inversion and eversion angles of the patient, wherein the periodic directional movements performed can be set according to experience, for example, the period is set to be five.

During the movements, the movement angle of the patient is collected in real time by the plantarflexion and dorsiflexion angle sensor, the adduction and abduction angle sensor, and the inversion and eversion angle sensor. The controller collects the motor current by a plantarflexion and dorsiflexion motor current sensor, an adduction and abduction motor current sensor, and an inversion and eversion motor current sensor. When the current is increased, it is judged that the patient has moved to his/her limit angle, and the system records the current movement angle. For example, a threshold at which the current is increased may be set to be: a current exceeding a normal operation current by 50%.

The motor current sensor is configured to acquire the motor current corresponding to the motor in the movement process of the patient. The motor current includes at least one of a plantarflexion and dorsiflexion motor current, an adduction and abduction motor current, and an inversion and eversion motor current; and based on this, the above motor current sensors include at least one of the plantarflexion and dorsiflexion motor current sensor, the adduction and abduction motor current sensor, and the inversion and eversion motor current sensor.

The working principle of current measurement is that the controller informs the motor to work in a position mode. After the patient puts a leg on the foot support, the current parameters of plantarflexion and dorsiflexion, adduction and abduction, and inversion and eversion at this time, i.e., the baseline currents, are collected and recorded by the plantarflexion and dorsiflexion motor current sensor, the adduction and abduction motor current sensor, and the inversion and eversion motor current sensor.

As shown in FIG. 5, which is a structural schematic diagram of a specific application of an ankle joint rehabilitation training device provided in an embodiment of the present disclosure, the device includes a sole motor 501, an ankle-side motor 502, a foot support 503, a shank support 504, and a bracket 505. The device further includes a sensor assembly (not shown in the drawing) and a controller (not shown in the drawing). As shown in FIG. 5, the ankle joint rehabilitation training device in FIG. 5 is in a position where the user is in a lying posture. In an actual rehabilitation training process, the motors drive the patient to actively exert force towards directions of plantarflexion and dorsiflexion, adduction and abduction, and inversion and eversion, respectively. In this process, current parameters of plantarflexion and dorsiflexion, adduction and abduction, and inversion and eversion, which can be referred to as measured currents, are collected and recorded by plantarflexion and dorsiflexion, adduction and abduction, and inversion and eversion motor current sensors.

It can be seen from the above description that the baseline current is a current generated when the patient does not actively exert a force, and the measured current is a current generated when the patient actively exerts a force. By the measured current and the baseline current, the magnitude of the current generated by the force of the person himself/herself can be obtained, corresponding to the magnitude of the force exerted by the person.

In the above embodiments, the actual movement parameter of the patient are acquired by the plantarflexion and dorsiflexion angle sensor, the adduction and abduction angle sensor, the inversion and eversion angle sensor, and the plantarflexion and dorsiflexion motor current sensor, the adduction and abduction motor current sensor, and the inversion and eversion motor current sensor, and further the actual movement ability of the patient is determined, which is more objective and more accurate.

Before the ankle joint rehabilitation training device starts the rehabilitation training, a step of selecting a data file corresponding to a target rehabilitation strategy can be performed first, for example, teaching data of a current rehabilitation therapist, i.e., teaching rehabilitation training data file, can be selected. It is also possible to select teaching data files, i.e., prescription data, generated in the present device or in similar remote devices from other rehabilitation therapists.

Regardless of whether the teaching data or the prescription data is selected, the controller performs data file decryption and data calibration and identification. When an identification result is safe and valid, the data file can be used, and when the data file is identified abnormal, the use is prohibited.

In a case where the user selects the prescription in the above two cases, the above controller in the embodiments of the present disclosure further includes a prescription selecting module, configured to acquire an application movement parameter from a preset prescription according to the actual movement parameter, wherein the preset prescription includes at least one of a preset movement action, a preset movement maximum angle, repeated times of a preset action, and a sequence of preset actions.

In the prescription mode, for example, if the patient performs 10 times of repeated plantarflexion and dorsiflexion actions, the amplitude, in other words, the maximum movement angle, generally increases gradually. For example, if the maximal movement degree of the patient is 20 degrees, then it may be increased slowly from 15 degrees to slightly more than 20 degrees, such as 22 degrees, by the prescription. If the movement degree of the patient is increased to 25 degrees, the movement range of the corresponding prescription may be changed to the range of 18-28 degree, which may slightly exceed the limit of the patient.

With regard to the case where the user selects the teaching data in the above two cases, the above controller in the embodiments of the present disclosure further includes a teaching module, configured to acquire teaching data of a field teaching process of the rehabilitation therapist, and acquire the application movement parameter matched with the actual movement parameter according to the teaching data, wherein the teaching data includes at least one of an angle, a movement trajectory, an angular velocity, and a force of the patient in the rehabilitation training process performed by the rehabilitation therapist on the patient.

The teaching mode refers to teaching of the rehabilitation therapist for the ankle joint rehabilitation training device, that is, the controller of the ankle joint rehabilitation training device records an action of the rehabilitation therapist for driving the foot support, and subsequently drives the ankle of the patient to move according to the recorded action. The rehabilitation therapist holds the foot support by hand according to personal clinical experience and techniques to perform degree-of-freedom movement of any one or a combination of plantarflexion and dorsiflexion, adduction and abduction, and inversion and eversion, for making the operation easy and autonomous, and achieving a real experience similar to that the rehabilitation therapist operates the patient's ankle joint.

Since the ankle joint rehabilitation training device provided in the embodiments of the present disclosure has a motor at each joint, when the rehabilitation therapist performs the teaching, resistances of the motors need to be overcome to drive the device to act, which is relatively laborious, therefore, an action for actively conforming to the action of the rehabilitation therapist after a thrust is felt needs to be configured for each motor, so as to achieve the effect of saving the physical strength of the rehabilitation therapist. Based on this, the above controller further includes a booster module, configured to apply a preset force value to the motor in the same direction as an operating direction of the rehabilitation therapist in the field teaching process of the rehabilitation therapist, so that the motor drives the foot support to move, wherein a net resistance to the motor in the movement process of the foot support is less than the preset force value.

For example, if the controller detects that an operating force of the rehabilitation therapist is greater than or equal to 5 N when the rehabilitation therapist performs the teaching work, the movement can be performed according to operation parameters. That is, the resistance felt by the rehabilitation therapist when the hand is acting will not exceed 5 N. That is, the movement is performed along the direction of movement of the rehabilitation therapist's hand, so as to assist in eliminating the resistance of the device itself. The effect of saving the force consumption of the rehabilitation therapist is achieved.

A rehabilitation training mode is that when the patient performs the rehabilitation training, the controller collects angle changes of plantarflexion and dorsiflexion, adduction and abduction, and inversion and eversion, and stores the records thereof. Meanwhile, the controller regularly collects the current changes of plantarflexion and dorsiflexion, adduction and abduction, and inversion and eversion, and stores the records thereof by the plantarflexion and dorsiflexion motor current sensor, the adduction and abduction motor current sensor, and the inversion and eversion motor current sensor. For example, the data may be collected every 10 ms.

After obtaining the above angles and current data, in order to apply the data to the rehabilitation training process of the patient more accurately, the data also may be filtered, i.e., the collected and recorded data parameters of the plantarflexion and dorsiflexion angles, the adduction and abduction angles, the inversion and eversion angles, the plantarflexion and dorsiflexion currents, the adduction and abduction currents, and the inversion and eversion currents are filtered, and an abnormal value generated by current oscillation, an abnormal value generated by mechanical structure vibration, and an artificial vibration abnormal value of the rehabilitation therapist operation are removed.

After the data file is selected, the controller will follow the measurement data fed back by a measurement data system of the patient to automatically adjust the parameters of the data file, wherein the parameters will be adjusted to an angle range and a muscle strength range which are matched with the measurement of the patient.

Meanwhile, the controller provides a function of manually modifying the parameters by the rehabilitation therapist, and the rehabilitation therapist can set a time period for performing the rehabilitation training by using the data file, for example, setting a period range to 1-100 times. The parameters, after being selected and set, are transmitted to the controller.

After the patient has performed several times of rehabilitation training, the strength and movement degree of the foot will be restored to a certain extent. Since the sensor assembly measures the actual movement parameters of the patient each time, the actual movement parameters will be different from the movement parameters previously set by the ankle joint robot. With the continuous restoration of the patient, the difference will be larger and larger. Therefore, when the difference is greater than a certain value, the application movement parameters of the patient need to be adjusted, so as to ensure the effect of the rehabilitation training.

Based on this, in some possible embodiments, the above controller further includes a machine learning module, configured to input the actual movement parameters and the application movement parameters into a pre-trained machine learning model, so as to obtain corrected application movement parameters output by the machine learning model.

Specifically, when the patient performs the rehabilitation training, the machine learning module will learn the actual movement parameters of the patient in real time, wherein the actual movement parameters include a movement trajectory, magnitude of a force actively exerted by the patient, and a movement speed.

When the difference presents significant statistical significance, e.g., greater than a set difference threshold, the machine learning module will perform calculation and analysis to propose optimized rehabilitation training parameters. The application movement parameters are reset according to the optimized rehabilitation training parameters. Thus, an intelligent and automatic intelligent rehabilitation training cycle system is formed.

When adjusting the application movement parameters, optimization coefficients of respective parameters are set as $a_i$, i=1, 2, 3 . . . ;

$$a_i = \frac{x_d - x_c}{x_c},$$

where $x_c$ is an application movement parameter value obtained from first detection after the application movement parameters are adjusted in a previous time, and $x_d$ is an application movement parameter value obtained from last detection after the application movement parameters are adjusted in the previous time.

Preferably, $$a_i = \frac{x_d - x_c}{x_c} \cdot x_j,$$

where $x_c$ is an application movement parameter value obtained from first detection after the application movement parameters are adjusted in a previous time, and $x_d$ is an application movement parameter value obtained from last detection after the application movement parameters are adjusted in the previous time, and $x_j$ are secondary correction parameters corresponding to various application movement parameters obtained through machine learning, where j=1, 2, 3 . . . $x_j$ is a further correction to $a_i$, and since $a_i$ only takes into account changes in movement ability of ankle joint during the correction in the previous time, there is a certain limitation.

The secondary correction parameter is obtained through machine learning, and a training set of the machine learning model is all previous movement parameter values and application parameter values of different patients. There are two training objectives, wherein one is to make the increase magnitude of the actual movement parameters as large as possible during the next training after a single application parameter adjustment, and the other is to make the increase magnitude of final actual movement parameter as large as possible after all application parameter adjustments. After passing the test set verification, the secondary correction coefficient for $a_i$ for all previous modification of application parameter values is obtained. For example, when the training is started, $a_1$ for the first modification of application parameter is corresponding to the secondary correction coefficient $x_1$, and so on. Because the secondary correction parameter takes into account historical effects and cumulative effects of all past modifications, and rehabilitation curve has non-linear features, the effect of each modification on the application parameter value is optimal. The application movement parameter is equal to the current actual movement parameter times $(1+a_i)$.

In the above embodiments, by optimizing the application movement parameters of the patient continuously by using the machine learning model in the training process, the application movement parameters are always matched with the current physical condition of the patient, thereby saving rehabilitation time, and also effectively improving the rehabilitation training effect.

In some possible embodiments, the above controller further can include a teaching data module, wherein the teaching data module specifically includes a function curve generator and a storage module.

The force magnitude, movement trajectory, and speed of the movement operated by the therapist can be arbitrarily changed. In the whole process, a sensing and acquisition system regularly collects angle changes in the plantarflexion and dorsiflexion, adduction and abduction, and inversion and eversion during the whole operation process of the rehabilitation therapist by the plantarflexion and dorsiflexion angle sensor, the adduction and abduction angle sensor, and the inversion and eversion angle sensor, and stores records thereof (the acquisition angle, the movement trajectory, the angular velocity, and the force, as a basis for subsequently controlling the ankle joint robot to repeat the actions of the rehabilitation therapist).

In the whole process, the controller regularly collects the current changes in plantarflexion and dorsiflexion, adduction and abduction, and inversion and eversion by the plantarflexion and dorsiflexion motor current sensor, the adduction and abduction motor current sensor, and the inversion and eversion motor current sensor, and saves records there of. For example, the collection may be made every 10 ms.

Thus, the function curve generator can generate a function curve through the following steps:

A11. calculating a movement speed through the collecting time period of 10 ms and change data of the movement angle;

A12. generating a combined movement trajectory curve of the plantarflexion and dorsiflexion angles, the adduction and abduction angles, and the inversion and eversion according to the filtered valid technical parameters of the plantarflexion and dorsiflexion angles, the adduction and abduction angles, the inversion and eversion angles, the plantarflexion and dorsiflexion currents, the adduction and abduction currents, and the inversion and eversion currents;

A13. applying a current change to the data of the filtered valid plantarflexion and dorsiflexion currents, adduction and abduction currents, and inversion and eversion currents, in terms of a movement trajectory curve. When the ankle joint rehabilitation training device drives a person's foot to move, in addition to changes in angle and angular velocity, the magnitude of the force applied to the foot also needs to be changed, therefore, in addition to the angle parameters, a parameter of current change is also needed to control the magnitude of a force exerted by the motor. The current change is the change of the technique and strength of the rehabilitation therapist in the teaching; and A14. finally, generating a function curve with a movement trajectory, speed changes, and force changes.

The data storage module stores data in particular through the following process:

A21. performing data extraction on the function curve generated by the function curve generator, i.e., extracting a group of data at a certain interval. The extracted data may constitute a set of rehabilitation actions of the ankle joint rehabilitation training device provided in the embodiments of the present disclosure, and it may be stored and reused subsequently, or shared with other ankle joint rehabilitation training devices for use; and A22, encrypting and calibrating the data and then converting the data into a data file stored in a computer.

The data file generated in the above supports local stand-alone use, and also supports use of intelligent rehabilitation training devices in other places by copying or downloading the data file through remote networking, thus realizing that multiple machines share the data file.

An embodiment of the present disclosure, on the basis of the above ankle joint rehabilitation training device, further provides an ankle joint rehabilitation training method, wherein the method is applied to a controller, which is the controller in the above ankle joint rehabilitation training device. Referring to a schematic flowchart of the ankle joint rehabilitation training method shown in FIG. 6, the method specifically includes the following steps:

S602: detecting the actual movement parameter of the patient by means of the sensor assembly, wherein the actual movement parameter is configured to characterize movement ability of an ankle joint of the patient at a current moment.

In the above, the actual movement parameter of the patient includes a movement angle and a current of the patient in the movement process; and in order to detect the movement angle and the current of the patient, the above sensor assembly may specifically include an angle sensor and a motor current sensor.

In the above, the angle sensor is configured to acquire the movement angle of the patient in the movement process, wherein the movement angle includes at least the following three: the plantarflexion and dorsiflexion angles, the adduction and abduction angles, and the inversion and eversion angles; and based on this, the above angle sensor includes at least the following three: a plantarflexion and dorsiflexion angle sensor, an adduction and abduction angle sensor, and an inversion and eversion angle sensor.

The motor current sensor is configured to acquire the motor current corresponding to the motor in the movement process of the patient. The motor current includes at least the following three: a plantarflexion and dorsiflexion motor current, an adduction and abduction motor current, and an inversion and eversion motor current; and based on this, the above motor current sensors include at least the following three: the plantarflexion and dorsiflexion motor current sensor, the adduction and abduction motor current sensor, and the inversion and eversion motor current sensor.

S604: generating a movement instruction matched with the patient according to the actual movement parameter and an application movement parameter corresponding to a target rehabilitation strategy selected by the patient.

Specifically, after obtaining the actual movement parameter, the controller can compare the actual movement parameter with the application movement parameter corresponding to the target rehabilitation strategy selected by the patient, and generate the movement instruction according to a comparison result.

Firstly, the controller performs coordinate system transformation on the movement angle to obtain a joint movement degree of the patient;

optionally, the motor current may include a measured current and a baseline current, and the patient's muscle strength can be obtained according to the measured current and the baseline current. In the above, the baseline current is a current generated in a movement process of the ankle joint rehabilitation training device when the patient does not exert a force, and the measured current is a current generated in the movement process of the ankle joint rehabilitation training device when the patient exerts a force.

The patient's muscle strength can be calculated by the following formula:

The patient's muscle strength $N$=(measured current $Ix$−baseline current $I0$) moment coefficient $K1$*muscle strength coefficient $K2$.

The target rehabilitation strategy may be the user-selected teaching data of the current rehabilitation therapist, i.e., the teaching rehabilitation training data file. The target rehabilitation strategy may also be teaching data file selected by the user and generated in the present device or in similar remote devices from other rehabilitation therapists, i.e., prescription data.

S606: triggering the motor to execute the movement instruction, so that the motor drives the foot support to move, so as to perform the rehabilitation training on the patient's foot.

The above ankle joint rehabilitation training device provided in the embodiments of the present disclosure acquires the actual movement parameter of the patient by the sensor assembly, generates the movement instruction by the controller according to the actual movement parameter and the application movement parameter. Finally the foot support is driven to move by the motor according to the movement instruction, so as to perform the rehabilitation training on the patient's foot. Since the current movement ability of the patient is considered in the process of rehabilitation training, the rehabilitation training is more suitable to personal condition of the patient; meanwhile, the rehabilitation training also considers the application movement parameter corresponding to the target rehabilitation strategy, therefore, the rehabilitation efficiency is considered while being adapted to the patient, and the effect of the rehabilitation training of the user is effectively improved.

In order to better perform the rehabilitation training on the patient, step S604 in the above method, generating a movement instruction matched with the patient according to the actual movement parameter and an application movement parameter corresponding to a target rehabilitation strategy selected by the patient, may specifically include:

(1) determining a parameter difference according to the actual movement parameter and the application movement parameter; and (2) adjusting the application movement parameter according to the actual movement parameter when the parameter difference is larger than the difference threshold value.

Specifically, when the patient performs the rehabilitation training, the machine learning module will learn the actual movement parameter of the patient in real time, wherein the actual movement parameter include a movement trajectory, magnitude of a force actively exerted by the patient, and a movement speed.

When the difference presents significant statistical significance, e.g., greater than a set difference threshold, the machine learning module will perform calculation and analysis to propose an optimized rehabilitation training parameter. The application movement parameter is reset according to the optimized rehabilitation training parameter. Thus, an intelligent and automatic intelligent rehabilitation training cycle system is formed.

In the description of the present disclosure, it should be indicated that orientation or positional relations indicated by terms "center", "upper", "lower", "left", "right", "vertical", "horizontal", "inner", "outer" and so on are based on orientation or positional relations as shown in the accompanying drawings, merely for facilitating the description of the present disclosure and simplifying the description, rather than indicating or implying that related devices or elements have to be in a specific orientation or configured and operated in the specific orientation, therefore, they should not be construed as limiting the present disclosure. Besides, terms "first", "second", and "third" are merely for descriptive purpose, but should not be construed as indicating or implying importance in the relativity.

Finally, it should be indicated that the embodiments above are merely for specific embodiments of the present disclosure, for illustrating the technical solutions of the present disclosure, rather than limiting the present disclosure. The scope of protection of the present disclosure should not be limited thereto. While the detailed description is made to the present disclosure with reference to the above-mentioned embodiments, those ordinarily skilled in the art should understand that the technical solutions recited in the above-mentioned embodiments still can be modified, or readily changed, or equivalent substitutions can be made to some of the technical features therein; these modifications, changes, or substitutions do not make the corresponding technical solutions essentially depart from the spirit and scope of the technical solutions of the embodiments of the present disclosure, and all should be covered within the scope of protection of the present disclosure. Therefore, the scope of protection of the present disclosure should be based on the scope of protection of the claims.

INDUSTRIAL APPLICABILITY

The ankle joint rehabilitation training device provided in the present disclosure acquires the actual movement parameter of the patient by the sensor assembly, determines a parameter difference according to the actual movement parameter and the application movement parameter by the controller, and adjusts the application movement parameter according to the parameter difference and the actual movement parameter. Finally the ankle joint rehabilitation training device generates the movement instruction, and drives the foot support to move by the motor according to the movement instruction, so as to perform the rehabilitation training on the patient's foot. Since the current movement ability of the patient is considered in the process of rehabilitation training, the rehabilitation training is more suitable to personal condition of the patient; meanwhile, the rehabilitation training also considers the application movement parameter corresponding to the target rehabilitation strategy, therefore, the rehabilitation efficiency is considered while being adapted to the patient, and the effect of the rehabilitation training of the user is effectively improved.

Besides, it may be understood that the ankle joint rehabilitation training device in the present disclosure may be reproduced, and may be used in a variety of industrial applications. For example, the ankle joint rehabilitation training device of the present disclosure can be used in the technical field of rehabilitation training.

What is claimed is:

1. An ankle joint rehabilitation training device, comprising:

a foot support, a bracket, a sensor assembly, a controller, and a motor, wherein:

the foot support:

is provided on the bracket, is movably connected to the bracket, and is configured to move relative to an axial direction of the bracket;

the sensor assembly and the motor are arranged on the foot support and both are in communication with the controller;

the foot support is configured to support a patient's foot;

the sensor assembly is configured to detect an actual movement parameter of the patient and send the actual movement parameter to the controller;

the actual movement parameter is configured to characterize a movement ability of the patient's ankle joint;

the controller is configured to generate a movement instruction matched with the patient according to the actual movement parameter and an application movement parameter corresponding to a target rehabilitation strategy of the patient, and issue the movement instruction to the motor;

the controller comprises a comparison module and an adjustment module;

the comparison module is configured to determine a parameter difference according to the actual movement parameter and the application movement parameter;

the adjustment module is configured to adjust the application movement parameter according to the actual movement parameter when the parameter difference is greater than a difference threshold;

the motor is configured to drive the foot support to move according to the movement instruction issued by the controller, so as to perform a rehabilitation training on the patient's foot, when one or more application movement parameters are adjusted, optimization coefficients of respective parameters are set as $a_i$, i=1, 2, 3 . . . ;

$$a_i = \frac{x_d - x_c}{x_c},$$

$x_c$ is an application movement parameter value obtained from the first detection after the application movement parameters are adjusted in a previous time, and $x_d$ is an application movement parameter value obtained from the last detection after the application movement parameters are adjusted in the previous time;

alternatively, $$a_i = \frac{x_d - x_c}{x_c} \cdot x_j,$$

$x_c$ is an application movement parameter value obtained from the first detection after the application movement parameters are adjusted in a previous time, $x_d$ is an application movement parameter value obtained from the last detection after the application movement parameters are adjusted in the previous time, and $x_j$ are secondary correction parameters corresponding to respective application movement parameters obtained through machine learning, wherein j=1, 2, 3 . . . ; and the application movement parameter is equal to the current actual movement parameter times $a_i$.

2. The device according to claim 1, wherein the actual movement parameter of the patient comprises a movement angle and a current of the patient in a movement process;

the sensor assembly comprises an angle sensor and a motor current sensor;

the angle sensor is configured to acquire a movement angle of the patient in the movement process; and the motor current sensor is configured to acquire a motor current corresponding to the motor in the movement process of the patient.

3. The device according to claim 2, wherein the movement angle comprises at least one of plantarflexion and dorsiflexion angles, adduction and abduction angles, and inversion and eversion angles; and the angle sensor comprises at least one of a plantarflexion and dorsiflexion angle sensor, an adduction and abduction angle sensor, and an inversion and eversion angle sensor.

4. The device according to claim 3, wherein the motor current comprises at least one of a plantarflexion and dorsiflexion motor current, an adduction and abduction motor current, and an inversion and eversion motor current; and the motor current sensor comprises at least one of a plantarflexion and dorsiflexion motor current sensor, an adduction and abduction motor current sensor, and an inversion and eversion motor current sensor.

5. The device according to claim 3, wherein the controller comprises an angle conversion module and a current conversion module, wherein the angle conversion module is configured to perform a coordinate system transformation on the movement angle to obtain a joint movement degree of the patient;

the current conversion module is configured to obtain the patient's muscle strength according to a measured current and a baseline current, wherein the baseline current is a current generated in a movement process of the ankle joint rehabilitation training device when the patient does not exert a force; and the measured current is a current generated in a movement process of the ankle joint rehabilitation training device when the patient exerts a force.

6. The device according to claim 2, wherein the motor current comprises at least one of a plantarflexion and dorsiflexion motor current, an adduction and abduction motor current, and an inversion and eversion motor current; and the motor current sensor comprises at least one of a plantarflexion and dorsiflexion motor current sensor, an adduction and abduction motor current sensor, and an inversion and eversion motor current sensor.

7. The device according to claim 6, wherein the controller comprises an angle conversion module and a current conversion module, wherein the angle conversion module is configured to perform a coordinate system transformation on the movement angle to obtain a joint movement degree of the patient;

the current conversion module is configured to obtain the patient's muscle strength according to a measured current and a baseline current;

the baseline current is a current generated in a movement process of the ankle joint rehabilitation training device when the patient does not exert a force; and the measured current is a current generated in a movement process of the ankle joint rehabilitation training device when the patient exerts a force.

8. The device according to claim 2, wherein the controller comprises an angle conversion module and a current conversion module, wherein the angle conversion module is configured to perform a coordinate system transformation on the movement angle to obtain a joint movement degree of the patient; and the current conversion module is configured to obtain the patient's muscle strength according to a measured current and a baseline current, wherein the baseline current is a current generated in a movement process of the ankle joint rehabilitation training device when the patient does not exert a force; and the measured current is a current generated in a movement process of the ankle joint rehabilitation training device when the patient exerts a force.

9. The device according to claim 8, wherein the patient's muscle strength is calculated through the following formula:

patient's muscle strength=(measured current−baseline current) moment coefficient*muscle strength coefficient.

10. The device according to claim 1, wherein the controller further comprises a machine learning module configured to input the actual movement parameter and the application movement parameter into a pre-trained machine learning model so as to obtain a corrected application movement parameter output by the machine learning model.

11. The device according to claim 1, wherein the controller further comprises a prescription selecting module, configured to acquire the application movement parameter from a preset prescription according to the actual movement parameter, wherein the preset prescription comprises at least one of a preset movement action, a preset movement maximum angle, repeated times of a preset action, and a sequence of the preset actions.

12. The device according to claim 1, wherein the controller further comprises a teaching module configured to acquire a teaching data of a field teaching process of a rehabilitation therapist and acquire the application movement parameter matched with the actual movement parameter according to the teaching data, and the teaching data includes at least one of an angle, a movement trajectory, an angular velocity, and a force of the patient in a rehabilitation training process performed by the rehabilitation therapist on the patient.

13. The device according to claim 12, wherein the controller further comprises a booster module configured to apply a preset force value to the motor in the same direction as an operating direction of the rehabilitation therapist in the field teaching process of the rehabilitation therapist so that the motor drives the foot support to move, and a net resistance to the motor in a movement process of the foot support is less than the preset force value.

14. The device according to claim 1, wherein the controller further comprises a teaching data module, and the teaching data module comprises a function curve generator and a storage module.

15. The device according to claim 14, wherein the function curve generator generates a function curve through the following steps:

calculating a movement speed through a collecting time period and a change data of a movement angle;

generating a combined movement trajectory curve of plantarflexion and dorsiflexion angles, adduction and abduction angles, and inversion and eversion according to filtered valid plantarflexion and dorsiflexion angles, adduction and abduction angles, inversion and eversion angles, plantarflexion and dorsiflexion currents, adduction and abduction currents, and inversion and eversion currents;

applying a current change to a data of the filtered valid plantarflexion and dorsiflexion currents, adduction and abduction currents, and inversion and eversion currents, in terms of a movement trajectory curve; and generating a function curve with a movement trajectory, a speed change, and a force change.

16. The device according to claim 14, wherein the data storage module stores data through the following process:

performing a data extraction on the function curve generated by the function curve generator; and performing an encrypting and calibrating processing on the data and then converting the data into a data file storable in a computer.

17. An ankle joint rehabilitation training method, applied to the ankle joint rehabilitation training device according to claim 1, wherein the method comprises the following steps:

detecting the actual movement parameter of a patient by means of the sensor assembly, wherein the actual movement parameter is configured to characterize a movement ability of the patient's ankle joint at a current moment;

generating the movement instruction matched with the patient according to the actual movement parameter and the application movement parameter corresponding to the target rehabilitation strategy selected by the patient; and triggering the motor to execute the movement instruction, so that the motor drives the foot support to move, so as to perform the rehabilitation training on the patient's foot.

18. An ankle joint rehabilitation training device, comprising:

a foot support, a bracket, a sensor assembly, a controller, and a motor;

wherein:

the foot support is provided on the bracket;

the foot support is movably connected to the bracket and is configured to move relative to an axial direction of the bracket;

the sensor assembly and the motor are arranged on the foot support and both are in communication with the controller;

the foot support is configured to support a patient's foot;

the sensor assembly is configured to detect an actual movement parameter of the patient and send the actual movement parameter to the controller;

the actual movement parameter is configured to characterize a movement ability of the patient's ankle joint;

the controller is configured to generate a movement instruction matched with the patient according to the actual movement parameter and an application movement parameter corresponding to a target rehabilitation strategy of the patient and issue the movement instruction to the motor;

the controller comprises a comparison module, an adjustment module and a teaching data module;

the comparison module is configured to determine a parameter difference according to the actual movement parameter and the application movement parameter;

the adjustment module is configured to adjust the application movement parameter according to the actual movement parameter when the parameter difference is greater than a difference threshold;

the motor is configured to drive the foot support to move according to the movement instruction issued by the controller so as to perform a rehabilitation training on the patient's foot;

the teaching data module comprises a function curve generator and a storage module; and the function curve generator generates a function curve through the following steps:

calculating a movement speed through a collecting time period and a change data of a movement angle;

generating a combined movement trajectory curve of plantarflexion and dorsiflexion angles, adduction and abduction angles, and inversion and eversion according to filtered valid plantarflexion and dorsiflexion angles, adduction and abduction angles, inversion and eversion angles, plantarflexion and dorsiflexion currents, adduction and abduction currents, and inversion and eversion currents;

applying a current change to a data of the filtered valid plantarflexion and dorsiflexion currents, adduction and abduction currents, and inversion and eversion currents, in terms of a movement trajectory curve; and generating a function curve with a movement trajectory, a speed change, and a force change.

* * * * *